United States Patent [19]
Williams et al.

[11] Patent Number: 5,902,411
[45] Date of Patent: May 11, 1999

[54] METHOD FOR MAINTAINING FLOORS

[75] Inventors: Todd A. Williams, Aliso Viejo; Richard A. Williams, Dana Point, both of Calif.

[73] Assignee: Economics in Technology, Costa Mesa, Calif.

[21] Appl. No.: 08/704,291

[22] Filed: Aug. 28, 1996

Related U.S. Application Data

[63] Continuation-in-part of application No. 08/532,182, Sep. 26, 1995, abandoned.

[51] Int. Cl.$^6$ .................... B08B 3/04; C23G 1/02
[52] U.S. Cl. ..................... 134/3; 134/6; 134/26; 134/28; 134/40; 134/41; 510/214; 510/217; 510/238; 106/36; 106/287.28
[58] Field of Search ............... 134/2, 3, 6, 26, 134/28, 40, 41; 510/214, 217, 238, 240; 106/36, 287.28

[56] References Cited

U.S. PATENT DOCUMENTS

| | | | |
|---|---|---|---|
| 3,063,875 | 11/1962 | Barry | 134/28 |
| 3,150,007 | 9/1964 | Kovachy | 134/28 X |
| 3,481,879 | 12/1969 | Salmone | 134/28 X |
| 3,608,567 | 9/1971 | Neill, Jr. et al. | 134/10 |
| 3,623,991 | 11/1971 | Sabatelli | 510/247 |
| 4,479,503 | 10/1984 | Pouchain et al. | 134/2 |
| 4,485,028 | 11/1984 | King | 510/239 |
| 4,496,470 | 1/1985 | Kapiloff et al. | 510/162 |
| 4,749,508 | 6/1988 | Cockrell, Jr. et al. | 510/201 |
| 4,761,245 | 8/1988 | Scardera et al. | 252/79.3 |
| 4,795,582 | 1/1989 | Ohmi et al. | 252/79.3 |
| 4,867,897 | 9/1989 | Kolstad | 424/662 |
| 4,877,459 | 10/1989 | Cockrell, Jr. et al. | 134/40 |
| 4,886,553 | 12/1989 | Gillich | 134/42 |
| 4,897,213 | 1/1990 | Brink | 510/240 |
| 5,028,458 | 7/1991 | Mineck | 427/355 |
| 5,192,460 | 3/1993 | Thomas et al. | 510/238 |
| 5,223,168 | 6/1993 | Holt | 510/238 |
| 5,364,551 | 11/1994 | Lentsch et al. | 510/100 |
| 5,382,298 | 1/1995 | Bondurant | 134/42 |
| 5,399,205 | 3/1995 | Shinohara et al. | 134/40 |
| 5,401,323 | 3/1995 | Freese et al. | 134/22.14 |
| 5,405,451 | 4/1995 | Avril | 134/34 |
| 5,423,910 | 6/1995 | Schiller | 134/40 X |

FOREIGN PATENT DOCUMENTS

| | | |
|---|---|---|
| 1486456 | 5/1967 | France . |
| 945024 | 12/1963 | United Kingdom . |

OTHER PUBLICATIONS

Material Safety Data Sheet, Sections I–IX, Revised Date Jan. 1, 1997; one page.

*Primary Examiner*—Jeffrey Snay
*Assistant Examiner*—Saeed Chaudhry
*Attorney, Agent, or Firm*—Renee J. Rymarz

[57] ABSTRACT

A method for treating and maintaining floors cleans the floor and restores an optimum coefficient of friction. The method involves a restoring phase and a cleaning phase, in which the cleaning phase is performed using the same solution as in the restoring phase, but in a diluted form. The method is applicable to cleaning solid hard floors such as those made of unglazed quarry tiles, glazed ceramic tiles and cement.

21 Claims, No Drawings

METHOD FOR MAINTAINING FLOORS

RELATED APPLICATION

The present application is a continuation-in-part of U.S. application Ser. No. 08/532,182, filed Sep. 26, 1995, now abandoned.

FIELD OF THE INVENTION

The invention relates to the maintenance of floors and specifically to a method of maintaining floor surfaces using a single cleaning solution. The solution is used first at full strength followed by multiple cleanings with a dilution of the same solution to maintain an effective coefficient of friction, thereby reducing the probability of slipping and falling.

BACKGROUND OF THE INVENTION

Hard floor surfaces in commercial and institutional establishments including restaurants, commercial kitchens, hospitals, laboratories and retail stores often become relatively slippery after use and repeated cleanings, leading to slip and fall injuries. Both employees and customers can be injured in slips and falls resulting in significant expense for medical attention, Workers' Compensation costs, lost time and liability-associated costs, such as insurance premiums, compensatory awards and/or settlement costs. In the food industry, slip and fall injuries to employees can also include indirect injuries such as when the employee touches a hot surface while attempting to arrest a fall and is burned.

Hard floor surfaces, when clean and new, have an inherent coefficient of friction (COF) characteristic of the surface material. The COF is generally defined as the amount of force parallel to a surface that is required to move or make slip a force or weight that is normal to the surface, divided by the weight. Rougher surfaces generally have a higher COF whereas smoother surfaces have a lower COF.

COF can be measured using the American Society for Testing and Materials (ASTM) Test C 1028-89. This test is the U.S. ceramic tile industry's standard test for assessing the slip resistance of ceramic tile and other like surfaces. The test is used to measure the frictional force between a flooring surface and a slider made of laboratory grade Neolite, a synthetic rubber. The test result can be expressed as a static COF. The term static is used because the two surfaces are at rest with respect to each other when the test is made.

The slider used in ASTM C 1028-89 is three inches square. The slider is first calibrated using a standard reference tile. The slider is then placed on the sample flooring surface and a 50 pound weight is placed on the slider. A dynamometer which measures force in pounds is used to pull the weighted slider to initiate a small movement across the flooring. This pulling force is then divided by the weight on the slider and the result, after correction using the slider calibration data, is equal to the static coefficient of friction.

The flooring can be tested both dry and wet with water. In each case, the COF is measured twelve times and the results are averaged. The ASTM test method specifies that each flooring sample should consist of three pieces of the tile. For each of the three pieces, a pull is made in each of four directions, e.g. north-east-south-west.

According to the Ceramic Tile Institute, a COF of greater than 0.6 is considered safe; a COF of between 0.5 to 0.6 is conditionally acceptable; and a COF less than 0.5 is considered unsafe.

The COF can be increased by the presence of macroscopic and microscopic variations in the surface. Macroscopically, a floor may include a pattern visible to the naked eye such as on tiles or in a terrazzo floor surface. Microscopically (e.g., when viewed at about a 450X magnification), a new clean floor material typically has a non-smooth surface made up of peaks and valleys and a pore structure which present a shoe-gripping surface. Some hard surfaces, such as those on polished marble and granite, terrazzo and smooth ceramic tiles have a relatively low COF and therefore are generally more slippery. Other surfaces typically used in commercial flooring including grouted quarry tile or cementitious concrete have a rougher surface texture resulting in a higher COF and a less slippery surface.

The COF of a hard surface can be altered over time by accumulation of fats and oils (collectively known as grease), accumulation of spilled food materials or other dirt, accumulation of cleaning residues especially from alkaline cleaning solutions, deposition of minerals from the water supply (water hardness), grout joint saponification or any combination of these factors. These accumulations generally fill the peaks and valleys and the pore structure of the surface making it smoother and lowering the COF. In commercial kitchens and restaurants, polymerization of fats and oils producing a hard, dense, greasy film is particularly responsible for increased slipperiness. Polymerized grease can reduce the COF of a floor surface about 50% in less than 30 days leading to an increased probability of slipping and falling by employees and patrons. Also, abrasion resulting from normal pedestrian traffic can lower the COF by polishing the surface over time. Abrasion polishing occurs especially on unglazed quarry tile surfaces.

Research in pedestrian safety has shown that the surface total mean peak-to-valley roughness (Rtm) is a good indicator of traction on surfaces wetted by water. The instrument used in this research is the Taylor Hobson Surtronic 10. The instrument has a sylus of radius of approximately 7 $\mu$m. The stylus traverses a path of 0.8 mm and measures the height difference between the lowest valley and the highest peak. Five such paths are evaluated and the results electronically averaged for each reading on the instrument. Roughness can then be expressed as the average maximum peak-to-valley height difference in $\mu$m. For reference, the approximate Rtm of some common materials is shown below in Table 1.

TABLE 1

| Material | Rtm ($\mu$m) |
| --- | --- |
| Clear glass | 0.1 |
| Picture frame non-glare glass | 3 |
| Silicon carbide sandpaper: | |
| 1500 grit (extremely fine) | 13 |
| 400 grit (super fine) | 30 |
| 320 grit (extra fine) | 46 |

Cleaning of hard surface floors to remove accumulated deposits and restore the COF to that of the clean new surface can be accomplished in a number ways. Scrubbing or mopping with a cleaning solution that contains an alkaline emulsifier can temporarily restore a floor surface but often leaves a residue of soap scum which can itself build up and eventually fill the peaks and valleys and a pore structure of the surface. Alkaline cleaning solutions can also precipitate silicon and calcium in the water supply resulting in accumulation of mineral deposits, thus reducing the COF despite the removal of grease film. Scrubbing with a deck brush and hot water (67° C./160° F.) followed by vacuuming of the wet surface ("wet vac") or squeegee removal of the solution containing the suspended dirt particles before thorough rinsing is effective at cleaning off grease film but requires expensive equipment and significant training of personnel in the use of the equipment.

Some of the types of the currently available cleaners include slip resistance packet cleaners (e.g., SAFETY-TRAC® by Kay Chemicals); powder alkaline cleaners (e.g., TIDE® by Colgate Palmolive); degreasers (e.g., RECOVER® by Dubois); sodium hypochlorite solutions (e.g., CLOROX®); alkaline-based steam cleaners (e.g., STEAM CLEANERS® by Union Carbide); and acid-based cleaners (e.g., DRACKET SURE-TRAC® by Bristol Meyers, SAFETY STEP® by Dynamic Research, and the cleaner disclosed in U.S. Pat. No. 5,223,168 issued to Holt). A number of additional liquid alkaline cleaners are available, such as REGAIN and MAXICLEAN by Ecolabs, POWERFOAM by SSDC Corporation and TITAN by Kay Chemical. However, all of the foregoing products suffer from a variety of drawbacks. Many of these products contain hazardous concentrations of chemicals, and therefore, require special care in use. Additionally, some of these products require multiple steps during their use (e.g., separate cleaning, restoring and neutralizing steps) or specialized equipment (e.g., steamer equipment). Moreover, most of these products are limited to a single use, and multiple products are required in order to adequately maintain a floor.

In addition to cleaning of the floor surface of accumulated grease, soil, mineral deposits and soap scum, restoration of the surface pore structure and peaks and valleys is important in improving floor texture, especially in areas of pedestrian traffic. Areas of pedestrian traffic include those in which employees and/or customers regularly walk during normal hours of operation of the commercial establishment. Restoration of surface irregularities has been accomplished by acid or mechanical etching (e.g., grit blasting) of floor surfaces. However, both processes have been found unsatisfactory because of exposure of personnel to highly acidic compounds, invasiveness of the cleaning procedure to normal commercial operations, and costs, particularly if a specialty contractor performs the procedure. Also, such etching procedures eventually weaken the floor tile surface. In addition, highly acidic solutions are subject to significant governmental regulation relating to health and safety during their use and transportation (i.e., those under OSHA and the Department of Transportation).

Surfaces that contain silicone dioxide components such as quarry tile have been treated with acidic solutions to etch the surface and thus restore a roughness to the floor. Treatments containing ammonium fluoride and hydrofluoric acid have long been known as agents for etching silicon substrates such as in the etching and frosting of glass or the treatment of silicone "chips" for computer components as disclosed by Scardera et al. in U.S. Pat. No. 4,761,245 and Ohmi et al. in U.S. Pat. No. 4,795,582.

Commercially available hydrofluoric acid treatment solutions have a pH in the range from about 0.1 to about 2.4. Treatment of quarry tile with these highly acidic solutions requires multiple steps. After the surface is treated with the acidic solution, it must be neutralized (usually with extensive rinsing) and dried. The highly acidic treatment increases the COF but also results in deep pitting and undercutting to produce sharp platelets in the tile surface. The deep pits can collect fats, oils, and dirt, thus decreasing the COF over time. The sharp undercut platelets can cut mop strings thus damaging cleaning equipment and leading to accumulation of lint. The platelets rapidly wear down in areas of pedestrian traffic and thus result in repolishing of those surfaces where maintaining a relatively high COF is most important.

The Americans with Disabilities Act (ADA) requires that areas accessible to disabled persons be slip-resistant. The U.S. Department of Justice's Access Board, which administers parts of ADA, in its Bulletin No. 4 recommends a minimum average static COF of 0.60 for level floors and 0.80 for ramps. This standard is also recommended by various other governmental and nongovernmental authorities, including the Ceramic Tile Institute and the City of Los Angeles. Not only must the initial flooring material meet these requirements, but, the requirements for COF must also be met on an ongoing basis.

Hence, there is a need for a method of restoring floor surfaces in commercial and/or institutional establishments that both cleans and restores the uneven surface of the floor in a manner that can be performed easily and safely by employees of the establishment with a minimum of training and equipment. There is a need for a method that restores a floor's COF without causing deep pitting or undercut platelet formation. Furthermore, there is a need for a method that employs chemical solutions that can be easily transported and safely used with standard levels of care (e.g., protective gloves and eye protection) without exposing personnel to highly acidic or alkaline solutions or toxic fumes.

SUMMARY OF THE INVENTION

One aspect of the present invention is a method for treating and maintaining a floor in a commercial or institutional establishment. The method has two components. In component (a), the following steps are performed at least once every five to ninety days: (i) applying an aqueous solution to the floor so as to restore the surface of the floor, the solution comprising a surfactant and a treating agent, the treating agent being either a fluoride-containing compound or an organic acid, the treating agent being in a concentration in the range 0.5 to 20% by weight, and the surfactant being in a concentration in the range 0.1% to 10.0% by weight, (ii) spreading the solution over the floor, and (iii) removing the solution from the floor. In component (b) the following steps are performed at least once every day that the commercial establishment is open and the steps of (a) are not performed: (i) applying the solution to the floor in a form which has been diluted from about 1 to 3 to about 1 to 500 in water, and (ii) cleaning the floor with the diluted solution. If desired, component (a) can be performed only on portions of the floor in the establishment that receive pedestrian traffic daily during normal operation of the commercial establishment. The spreading, removing and cleaning steps can be performed using a combination of abrasive scrubbing and mopping. In one such embodiment, the abrasive scrubbing and mopping is performed with a single device, such as a mop with an abrasive pad for abrasive point load mopping. The abrasive scrubbing can also be performed using a broom or deck brush.

In certain preferred embodiments, the treating agent is a fluoride-containing compound, such as hydrofluoric acid in a concentration in the range 0.5 to 8% by weight or ammonium bifluoride in a concentration in the range 0.5 to 20% by weight. Thus, in one embodiment, the treating agent is hydrofluoric acid in a concentration in the range of about 0.5% to about 8% by weight, more preferably in a concentration in the range of about 2.6% to about 8% by weight. In another embodiment, the treating agent is ammonium bifluoride in a concentration in the range of about 2 to about 4% by weight, more preferably in a concentration of about 2.5% by weight. In other embodiments, the treating agent is an organic acid, such as acetic acid, ascorbic acid, propionic acid, citric acid, glycolic acid, lactic acid, malic acid, tartaric acid, maleic acid, oxalic acid, malonic acid, sulfamic acid, fumaric acid, benzoic acid and gluconic acid.

The solution used can include a buffering agent. The pH of the solution is preferably in the range of from about 2.5 to 6.5, more preferably in the range of 3 to 6, and still more preferably in a pH range of 4.5 to 5.5. The solution used in component (b) has preferably been diluted from about 1 to 50 to about 1 to 300 in water, more preferably from about 1 to 100 to about 1 to 150 in water, and most preferably about 1 to 128 in water.

The surfactant can be a nonionic, anionic, amphoteric, ampholytic, zwitterionic or cationic detergent or a mixture thereof. In a preferred embodiment, the surfactant is nonylphenoxypolyethyloxyethanol in a concentration in the range 1.2 to 1.8% by weight.

DETAILED DESCRIPTION OF THE INVENTION

The present invention relates to a method for maintaining floor surfaces in commercial and institutional establishments. Included within the commercial and institutional establishments to which the method of the present invention is applicable would be all non-residential developments as well as the common areas of multi-family residential developments.

In the method of the present invention, a single treating solution is used at different concentrations to maintain the floor surface at acceptable COF levels. The method comprises both a restoring phase and a cleaning phase. In the restoring phase, the floor is restored using a treating solution containing a surfactant and a treating agent to clean and restore the floor to its optimum COF. This step is repeated every five to ninety days that the establishment is in operation depending on the accumulation of grease and dirt. In order to save solution and time, the treating solution can be applied as a restorer only to those areas of heavy pedestrian traffic or areas in which greasy polymerization is a problem (e.g., areas of the kitchen near cooking machinery).

Abrasive point load mopping with a mop that combines an abrasive pad with strands of absorbent material is a mechanical means of breaking up and removing surface contaminants from a floor or other surfaces including cement walkways. A mop effective for abrasive point load mopping is disclosed in copending U.S. application No. 08/334,203, filed Nov. 4, 1994. Abrasive point load mopping can be used in conjunction with the method of the present invention in order to produce superior results.

The cleaning phase is generally conducted at least once a day. In the cleaning phase, the floor is maintained by cleaning with a dilution of between 1:3 and 1:500, more preferably 1:4 to 1:128, of the same solution in water. Under certain conditions, this cleaning step need not be performed on days when the restoring step is performed or when the establishment is not in operation.

In both the restoring and cleaning phases of the method, the treating solution can be applied to the floor with conventional mopping action, i.e. rotational movement using strands of absorbent material. The treating solution with the suspended grease and dirt can then be removed.

In one preferred embodiment of the method of the present invention, mopping in the cleaning and/or restoring phase is performed using a mop with an abrasive pad for abrasive point load mopping. Such a mop is described in co-pending U.S. patent application Ser. No. 08/334,203, filed Nov. 4, 1994, the disclosure of which is hereby incorporated by reference.

The treating solution used in the method of the present invention comprises an aqueous solution containing a surfactant and a treating agent. The treating agent can be any of a variety of fluoride-containing compounds in a concentration range from 0.5 to 20% by weight, more preferably 1 to 10%, and still more preferably 2 to 8% by weight. The percentages given are the full strength values used in the restoring phase of the method. Preferred fluoride-containing chemicals for use as treating agents include ammonium bifluoride ($NH_4HF_2$) and hydrofluoric acid (HF). When HF is used, it is most preferably in a concentration in the range 0.5 to 8% by weight. We have found that higher concentrations of HF are unduly corrosive when used in connection with the methods of the present invention.

In other embodiments of the invention, the treating agent can be an organic acid, which is also preferably in a concentration in the range 0.5 to 20% by weight more preferably 1 to 10%, and more preferably 2 to 8%. Organic acids useful in this invention include monocarboxylic acid, saturated and unsaturated dicarboxylic acids, and hydroxycarboxylic acids. These include acids from the nonlimiting group of acetic acid, ascorbic acid, propionic acid, citric acid, glycolic acid, lactic acid, malic acid, tartaric acid, maleic acid, oxalic acid, malonic acid, sulfamic acid, fumaric acid, benzoic acid and gluconic acid.

As discussed above, many prior art floor restoration products include phosphoric acid ($H_3PO_4$). We have found that phosphoric acid is overly corrosive, and thus, preferably, phosphoric acid is either not present or present in a concentration less than 1%, still more preferably less than 0.5%, in the solutions used in connection with the method of the present invention.

The surfactant can be a nonionic, anionic, cationic, amphoteric, ampholytic or zwitterionic detergent and preferably is nonylphenoxypolyethyloxyethanol in a concentration in the range 0.1% to 10.0%, more preferably 0.5 to 5%, and still more preferably 0.6 to 1.8%. In a preferred embodiment, the surfactant is the anionic surfactant nonylphenoxypolyethyloxyethanol in a concentration of 1.6%. Other preferred anionic surfactants are anionic detergents including sodium lauryl sulfate, sodium dodecyl benzyne sulfate, potassium laurate, sodium dodecan sulfonate and members of the alkyl ether sulfate group (e.g., sodium lauryl ethoxysulfate). Other useful surfactants include a polyoxyethylene (POE) fatty acid ester such as nonionic surfactants prepared by esterification of fatty acids with ethylene oxide or polyethylene glycol. Commercially available surfactants that are polyoxyethylene esters of fatty acids include but are not limited to those sold under the following trademarks: EMULPHOR®, ETHOFAT®, LIPOPEG®, NONISOL®, PEGOSPERSE®, STEROX CD® and VARONIC 400®. Other useful nonionic surfactants are ethoxylates of fatty alcohols, such as Neodols, Tergitols, Genapols, Polytergents, Surfonics and Alfonics. Still other nonionic surfactants which are useful in the context of the present invention are the black polymers of ethylene oxide and propylene oxide, such as Pluronics and Tetronics. Additional available surfactants include but are not limited to mixtures of unesterified polyethylene glycols and mono- and distearate esters of polyethylene glycols (e.g., MAPEG 400 MS®, EMEREST 2640®), and mixtures of mono- and distearate esters of polyoxyethylene and free POE (e.g., LIPAL 39S®, MAPEG S 40®, MYRJ 52S®, PEGOSPERSE 1750-MS®). In addition to the foregoing, any of a variety of well known synthetic amphoteric, ampholytic, zwitterionic and cationic surfactants or mixtures of any of the types of surfactants well known in the art may be used.

Optionally, the treating solution can also include a chelating agent. The chelating agent allows the product to be used more easily in areas which have hard water, including most of the Western United States. Hard water promotes crystallization of the product in dispensing apparatuses such as "Hydro" and "Dema" proportioners. These proportioners are well known in the art and work on the Venturi principle to allow varying the dilution of the product from 1:1 to 1:256 or more. A 1:256 dilution corresponds to one ounce of product per gallon of water. The chelating agent prevents crystallization by building the detergency of the solution.

In a preferred embodiment, the chelating agent has a neutral or near neutral pH (i.e., 6.5–7.5). Such chelating agents include, for example, sodium hexametaphosphate, tetrapotassium pyrophosphate, sodium tripolyphosphate and tetrasodium EDTA. We have achieved especially good results using sodium hexametaphosphate. The incorporation of acidic chelating agents into the floor cleaning solutions of the present invention is also contemplated. Such agents include, for example, sodium phosphonate, potassium phosphonate and organic phosphonates. The incorporation of other neutral, near neutral or acidic chelating agents into the instant floor cleaning solutions in also within the scope of the invention. In a preferred embodiment, the chelating agent is incorporated at a concentration from about 0.05% to about 2.0% in the full strength solution, but more preferably from about 0.1% to about 1.0%.

The pH of the solution used in the present invention should be adjusted carefully. The pH can be adjusted to an appropriate range using any of a variety of buffering agents well known in the art. Many of the treating agents are themselves buffers, such as ammonium bifluoride.

If the pH is too acidic, the solution is more hazardous and therefore not only can result in more injuries, but also requires additional precautions in transportation, storage and use. Further, too acidic a pH can lead to excessive etching, leading to high Rtm scores. Floors having excessively high Rtm scores have very deep "valleys" between "peaks." These deep valleys form reservoirs for the accumulation of grease and other contaminants. Contaminants in these reservoirs can be extremely difficult to clean. Thus, high Rtm scores can, unexpectedly, actually result in lower COF's. Therefore, the goal of restoration in the method of the present invention is to provide moderate Rtm scores which provide sufficient peaks and valleys to increase COF without creating deep reservoirs for accumulation of COF-lowering contaminants. Thus, we have unexpectedly discovered that moderate acidity results in the best performance.

In view of the foregoing, the method of the present invention makes use of treating solution having a pH in a range of between about 2.5 and 6.5, preferably between 3.0 and 6.0, more preferably between 4.0 and 5.5, and still more preferably about 4.5 to 5.0. In a particularly preferred embodiment using am monium bifluoride at about 2.3–2.5%, the pH is about 4.85. Because the treating solution is not strongly acidic even when used full strength, it can be applied and mopped off the floor without first neutralizing or extensively rinsing to remove the solution.

The treating solution is preferably packed in 1 to 5 gallon containers which are preferably made of synthetic organic polymeric plastic material, such as polyvinyl chloride (PVC), polypropylene or polyethylene. If the treating solution contains a fluoride containing acid, care should be taken not to pack the solution in a glass container because the fluoride compounds can etch and weaken the glass. Treating solutions that do not contain fluoride compounds may be packed in glass, but for safety considerations, glass is less preferred because of the potential for cracking, breaking or shattering if dropped during use or transport of the solution in the container.

Because the treating solution is not highly acidic, transportation, storage and use will only require the ordinary level of care normally associated with potential exposure of skin to any agent which can act as a dermatological irritant. That is, when the treating solution is used at full strength or measured into a container for dilution for use in maintaining the floor, latex or similar impermeable gloves should preferably be worn to protect the hands and eyewear such as safety glasses or goggles should be worn to protect eyes from splashed liquid. Protective gloves and eyewear should preferably be worn during the entire cleaning process.

The general principles of the present invention may be more fully appreciated by reference to the following non-limiting examples.

EXAMPLE 1

COMPOSITION OF A SAMPLE PRODUCT USABLE ACCORDING TO THE PRESENT INVENTION nonylphenoxypolyethyloxyethanol 1.6%
ammonium bifluoride 2.3–2.5%
water balance
pH 4.85

EXAMPLE 2

DETERMINATION OF STATIC COF OF CERAMIC TILE

One half of a six inch by six inch white glazed ceramic tile was etched with the product of Example 1 at full strength for 20 minutes. Each half was tested 12 times according to ASTM C 1028-89, as described in the Background of the Invention section hereof. The results are shown in Table 2.

TABLE 2

|   | Untreated | | Treated | |
|---|---|---|---|---|
|   | Dry | Wet | Dry | Wet |
| 1 | 0.68 | 0.42 | 0.68 | 0.61 |
| 2 | 0.68 | 0.43 | 0.66 | 0.56 |
| 3 | 0.72 | 0.43 | 0.64 | 0.56 |
| 4 | 0.72 | 0.42 | 0.61 | 0.57 |
| 5 | 0.69 | 0.42 | 0.67 | 0.57 |
| 6 | 0.72 | 0.42 | 0.66 | 0.56 |
| 7 | 0.73 | 0.47 | 0.67 | 0.59 |
| 8 | 0.72 | 0.45 | 0.64 | 0.55 |
| 9 | 0.71 | 0.46 | 0.70 | 0.55 |
| 10 | 0.73 | 0.44 | 0.70 | 0.56 |
| 11 | 0.74 | 0.43 | 0.73 | 0.55 |
| 12 | 0.70 | 0.42 | 0.71 | 0.57 |
| Avg. | 0.71 | 0.43 | 0.67 | 0.57 |

As can be seen from the results reported in Table 2, the greatest danger from low COF of glazed ceramic tire occurs when the tire is wet. As also seen from these results, the use of the product according to the present invention resulted in a significant increase in the wet COF of the tire.

EXAMPLE 3

DETERMINATION OF Rtm OF CERAMIC TILE

One half of a six inch by six inch white glazed ceramic tire was etched with the product of Example 1 at full strength for 20 minutes. The Rtm of each half was tested, as described in the Background of the invention section hereof. Thirty individual tests were run, with the results shown in Table 3.

TABLE 3

|    | Untreated | Treated |
|----|-----------|---------|
| 1  | 5.6       | 5.1     |
| 2  | 5.2       | 4.4     |
| 3  | 4.1       | 4.5     |
| 4  | 5.6       | 4.1     |
| 5  | 4.7       | 3.9     |
| 6  | 4.0       | 5.1     |
| 7  | 3.9       | 5.2     |
| 8  | 5.1       | 4.5     |
| 9  | 4.6       | 5.2     |
| 10 | 4.9       | 3.6     |
| 11 | 6.9       | 4.2     |
| 12 | 4.0       | 5.9     |
| 13 | 5.0       | 4.8     |
| 14 | 4.7       | 4.8     |
| 15 | 3.7       | 5.3     |
| 16 | 5.0       | 4.8     |
| 17 | 4.6       | 4.1     |
| 18 | 4.3       | 5.0     |
| 19 | 6.6       | 4.3     |
| 20 | 5.0       | 5.5     |
| 21 | 5.3       | 5.1     |
| 22 | 5.5       | 5.0     |
| 23 | 3.1       | 4.2     |
| 24 | 4.3       | 3.7     |
| 25 | 3.3       | 5.1     |
| 26 | 4.2       | 3.8     |
| 27 | 4.8       | 4.8     |
| 28 | 4.2       | 4.6     |
| 29 | 3.6       | 4.4     |
| 30 | 4.3       | 5.2     |
| avg. | 4.6     | 4.7     |

As can be seen from the results reported in Table 3, the Rtm of the treated quarry tile is substantially identical to the treated. This is accomplished, while at the same time improving wet COF, as reported in Example 2. This is a significant result in that heretofore, improving COF has generally required a correspondent increase in Rtm. Such an increase in Rtm is undesirable in the food service and other industries because the increased valleys serve as traps for grease and other contaminants which can lead to lowered COF on dirty floors.

EXAMPLE 4

INSTRUCTIONS FOR USE OF COMPOSITION IN ACCORDANCE WITH THE PRESENT INVENTION

The following instructions can be posted in a wall poster in an area that employees using product in accordance with the present invention can readily view:

DAILY FLOOR MAINTENANCE

1. Wipe up spills and sweep floor surface.

2. Dispense 3–5 ounces of product into clean mop bucket with approximately 3 gallons water.

3. Using a dripping wet mop, apply solution to floor surface.

4. Aggressively scrub the mopped area. Scrub kitchen daily and customer areas weekly.

5. Mop up, squeegee or rinse to drain soiled solution.

6. Dry mop or squeegee floor surface dry.

(DURING THE DAY, DAMP MOP FLOOR SURFACE WITH PRODUCT.)

DUMPSTERS, DRIVE-THRUS AND CONCRETE

1. Sweep area of all debris.

2. Mix a 50/50 mixture of Product and tap water.

3. Using a deck brush or dripping wet mop, apply solution to surface.

4. Allow solution to stand for 3–5 minutes and aggressively scrub area.

5. Rinse surface with tap water.

TRACTION TREATMENT

1. Wipe up spills and sweep floor surface.

2. Use of one of three methods of application:

Method #1-Straight from container pour undiluted a puddle of product every five feet. Evenly spread chemical with broom or brush across floor surface. Yield=400 to 450 square feet.

Method #2-Pour product undiluted into a clean empty mop bucket. Using a new mop head dip mop into chemical in bucket. Using a dripping wet mop evenly spread chemical across floor surface. Yield=650 to 750 square feet.

Method #3-Pour Product undiluted into a clean empty tank sprayer. Spray chemical across floor surface evenly. Yield=850 to 1000 square feet.

3. Allow Product to stand on floor surface for the following times:

Quarry Tile -15 to 20 minutes; or

Glazed or Porcelain Tile -30 to 40 minutes.

If treated areas start to dry before chemical standing time is finished, apply more chemical only to that area.

4. Mop up or squeegee solution to drain.

5. Damp mop with tap water or rinse floor surface.

6. Dry mop or squeegee floor surface dry.

IF FLOOR SURFACE TRAFFIC AREAS BECOME SLIPPERY IT MAY BE NECESSARY TO SPOT TREAT SMALL AREAS IN BETWEEN TRACTION TREATMENTS. THIS WOULD DEPEND ON FLOOR SURFACE TRAFFIC.

EXAMPLE 5

CLEANING AND MAINTAINING A QUARRY TILE FLOOR IN A RESTAURANT

The kitchen area of a fast food restaurant has a floor made of quarry tiles. The optimum COF for the particular tile used in this establishment is 0.7 to 0.9. After the normal hours of service, the floor is swept to remove dropped food particles and obvious spills are wiped up. Then a treating solution containing ammonium bifluoride in a concentration of 2.5% by weight and 1.5% by weight of the surfactant nonylphenoxypolyethyloxyethanol is applied to the floor at full strength from a 1 gallon container. Approximately 5 to 8 ounces (150 to 240 ml) is applied to the floor and a mop that has been previously dampened with water is used to vigorously spread the solution to the floor in an area of about 5 square feet. In places where spots, spilled food or build up from previous cleaning solutions (soap scum) are visible, the mopping also includes rotationally wiping the area in a conventional mopping pattern. The same applying and spreading step is repeated until the entire floor has been treated. The solution is allowed to stand on the floor surface for about 20 minutes and then it is removed by mopping up with a damp mop. The mop is rinsed in water after each treatment of an area of about 5 square feet. Rinsing removes the treating solution as well as suspended contaminants. Rinsing is accomplished by pressing or wringing the mop out to remove excess water before using it to remove the treating solution. The area is dry mopped to speed drying if the area is needed immediately for normal operations. If not needed immediately, the floor may be allowed to air dry.

The customer area is treated in the same manner as the kitchen area. Treatment of both areas restores the COF to about 0.7–0.9 when measured immediately after cleaning, which is the optimum COF level for the tile in use.

During the next 14 days, the kitchen and the customer areas that are subject to pedestrian traffic (e.g., at the entrances and exits and near areas for dispensing self-service condiments or drinks) are maintained by daily mopping with a 1 to 128 dilution of the treating solution in water that is applied with a mop. The diluted solution is then immediately removed from the floor by damp mopping. If needed, the areas may be dry mopped to speed drying. This process maintains the COF at about 0.7–0.9 after each mopping, which is the optimum COF level for the tile in use.

On the thirtieth day of normal operation, the kitchen and the customer areas subject to pedestrian traffic are treated as done on the first day with the full-strength treating solution. Areas of the kitchen that are not near food preparation (e.g., storage areas) and areas of the customer area that are not subject to heavy pedestrian traffic (e.g., table areas that are only used during peak hours of service) are maintained using the diluted solution as on days 2 and 3. All areas are treated with the full-strength solution at least once per week to ensure restoration of a COF of the tile to its optimum level of about 0.7–0.9.

EXAMPLE 6

CLEANING AND MAINTAINING A CERAMIC TILE FLOOR IN A COMMERCIAL OFFICE BUILDING

The hallways and waiting areas of a commercial office building that are floored with white and colored glazed ceramic tiles are cleaned and maintained using the following method. On day 1, during non-peak hours of service (e.g., evenings), the floors are swept to remove dirt. The area is divided and marked (e.g., with signs or rope dividers) into sections to allow passage or use of a portion of the area. For example, the left side of a hallway is cleaned while the right side remains open for pedestrian traffic. Then a treating solution containing hydrofluoric acid in a concentration of 2% by weight, a nonionic surfactant in a concentration range of 1% to 3.0% by weight and a buffering agent to maintain a pH of about 4.5 is applied at full strength to the section to be cleaned. About 6 to 10 ounces (180 to 300 ml) of solution is poured onto the floor surface and then spread evenly about the area with a damp mop until all the tiles are covered with a thin layer of the treating solution. The treating solution is allowed to stand on the tiles for about 40 min and then is removed using a squeegee device and/or a mop to absorb the excess liquid. The floor is then damp mopped to remove any remaining treating solution and allowed to air dry. When the treated area has dried, the same procedure is repeated on the side of the hallway or portion of the room that was previously untreated.

On days 2 through 59, the floor is swept and maintained by mopping the floor with the same solution diluted I to 128 in water in a conventional mop bucket. A conventional mop may be used but preferably a mop with an attached abrasive pad is used. The floors are again divided into sections and mopped with the diluted treating solution. The floor is damp mopped to remove the excess liquid and can be dry mopped to speed up the drying process. Alternatively, the floor can be squeegeed to remove the liquid. The same maintaining step is then repeated on the uncleaned portions of the hallways and rooms.

On day 60, the same treatment as applied on day 1 is repeated to begin the next cycle of restoring and maintaining the floors. If during the course of a cycle an area becomes slippery due to spilled fluids or unusual soiling, the area is treated as if on day 1 (i.e., the cycle can be initiated at any time during which use of the floor necessitates additional cleaning). During the entire cycle the COF of the floors is maintained at about 0.6–0.8 for all treated areas.

EXAMPLE 7

CLEANING AND MAINTAINING A CEMENT FLOOR IN A PARKING GARAGE

In a public parking garage with cementitious concrete flooring, the walkways, entrances and areas around elevators or stairwells are cleaned and maintained using a treating solution of citric acid and glycolic acid, each in a concentration of about 7–10% by weight, an anionic surfactant that is a polyoxyethylene ester of a fatty acid (e.g., PEGOSPERSE®) in a concentration of 1.5% to 2.0% by weight. On day 1, the areas to be treated are swept to remove loose dirt. Then the area is blocked off to limit access to the area by customers and the treating solution is applied to the floor at full strength. About 10–16 oz of solution is poured onto the floor and spread evenly across the floor surface using a broom with synthetic or natural bristles. The procedure is repeated as needed to cover the entire area to be treated. For areas that are particularly dirty, especially if there is evidence of oil or grease, the area is vigorously scrubbed using the bristles of the broom. Then the solution is allowed to stand on the treated area for 3 to 10 min, after which the area is squeegeed to remove the treating solution and suspended dirt particles. If drains are present in the area, the solution can be squeegeed directly into the drain. The area is then damp mopped to remove any remaining treating solution and suspended dirt. The mop is rinsed with clean water between moppings to remove the dirt.

On days 2 through 6, the areas are mopped using the same solution that has been diluted about 1 to 50 in water. After mopping the areas clean, they are damp mopped to remove excess solution and suspended dirt. The floor can be dry mopped to speed drying or simply allowed to air dry. After the area is dry it is again opened to pedestrian traffic. On day 7, the procedure starts again as for day 1 and precedes through the entire cycle. If conditions change making the floor more slippery (e.g., additional dirt and grease accumulating in the garage during rainy weather), the cycle can be shortened so that the full-strength treatment is done every 3 to 5 days instead of once a week.

The same treatment scheme can be used to treat the entire parking garage or only those portions where the floor becomes slippery such as areas where cars enter and exit the garage or where oil and grease accumulate from the cars. In all cases, with continual restoring and maintaining of the floors on a weekly basis, the COF remains at 0.6 or greater.

Although the present invention has been described in the context of particular examples and preferred embodiments, it will be understood that the invention is not limited to such embodiments. Instead, the scope of the present invention shall be measured by the claims that follow.

What is claimed is:

1. A method for treating and maintaining a floor in a commercial or institutional establishment, comprising:
   (a) performing the following steps at least once every five to ninety days:
      (i) applying an aqueous solution to the floor so as to restore the surface of the floor, said solution consisting essentially of a surfactant and a treating agent, said treating agent consisting essentially of a fluoride-containing compound, said treating agent being in a concentration range of about 0.5 to 20% by weight, and said surfactant being in a concentration range of about 0.1 to 10.0% by weight;
      (ii) spreading said solution over the floor;
      (iii) removing said solution from the floor; and
   (b) performing the following steps at least once every day that step (a) is not performed and the floor is subject to pedestrian traffic:
      (i) applying said solution to the floor in a form which has been diluted from about 1 to 3 to about 1 to 500 in water; and
      (ii) cleaning said floor with the diluted solution.

2. The method of claim 1, wherein said fluoride-containing compound is selected from the group consisting of hydrofluoric acid in a concentration range 0.5 to 8% by weight and ammonium bifluoride in a concentration range 0.5 to 20% by weight.

3. The method of claim 1, wherein the solution further comprises a buffering agent.

4. The method of claim 1, wherein the solution is in a pH range of from about 2.5 to 6.5.

5. The method of claim 1, wherein the solution is in a pH range of 3 to 6.

6. The method of claim 1, where he solution is in a pH range of 4.5 to 5.5.

7. The method of claim 1, wherein the solution used in step (b) has been diluted from about i to 50 to about 1 to 300 in water.

8. The method of claim 1, wherein the solution used in step (b) has been diluted about 1 to 100 to about 1 to 150 in water.

9. The method of claim 1, wherein the solution used in step (b) has been diluted about 1 to 128 in water.

10. The method of claim 1, wherein the treating agent is hydrofluoric acid in a concentration range of about 0.5 to about 8% by weight.

11. The method of claim 1, wherein the treating agent is hydrofluoric acid in a concentration range of about 2.6 to about 8% by weight.

12. The method of claim 1, wherein the treating agent is ammonium bifluoride in a concentration range of about 2 to about 4% by weight.

13. The method of claim 1, wherein the treating agent is ammonium bifluoride in a concentration of about 2.5% by weight.

14. The method of claim 1, wherein the surfactant is a nonionic, anionic, amphoteric, ampholytic, zwitterionic or cationic detergent or mixture thereof.

15. The method of claim 1, wherein the surfactant is nonylphenoxypolyethyloxyethanol in a concentration range 1.2 to 1.8% by weight.

16. The method of claim 1, wherein step (a) is only performed on portions of the floor in the establishment that receive pedestrian traffic daily during normal operation of the commercial establishment.

17. The method of claim 1, wherein said spreading, removing and cleaning steps are performed using a combination of abrasive scrubbing and mopping.

18. The method of claim 17, wherein the abrasive scrubbing and mopping is performed with a single device.

19. The method of claim 17, wherein the abrasive scrubbing is performed using a broom, deck brush or a mop with an abrasive pad for abrasive point load mopping.

20. A method for treating and maintaining a floor in a commercial or institutional establishment, comprising:
   (a) performing the following steps at least once every five to ninety days:
      (I) applying an aqueous solution to the floor so as to restore the surface of the floor, said solution consisting essentially of a surfactant and a treating agent, said treating agent consisting essentially of an organic acid, said treating agent being in concentration range of about 0.5 to 20% by weight, and said surfactant being in a concentration range of about 0.1 to 10.0% by weight;
      (ii) spreading said solution over the floor;
      (iii) removing said solution from the floor; and
   (b) performing the following steps at least once every day that step (a) is not performed and the floor is subject to pedestrian traffic:
      (i) applying said solution to the floor in a form which has been diluted from about 1 to 3 to about 1 to 500 in water; and
      (ii) cleaning said floor with the diluted solution.

21. The method of claim 20, wherein the organic acid is selected from the group consisting of acetic acid, ascorbic acid, propionic acid, citric acid, glycolic acid, lactic acid, malic acid, tartaric acid, maleic acid, oxalic acid, malonic acid, sulfamic acid, fumaric acid, benzoic acid and gluconic acid.

* * * * *